US012364341B2

(12) United States Patent
Micklos et al.

(10) Patent No.: US 12,364,341 B2
(45) Date of Patent: Jul. 22, 2025

(54) GEL LAMINATION TO VISCOELASTIC FOAM

(71) Applicant: Elements International Group, LLC, Mesquite, TX (US)

(72) Inventors: Josh Micklos, Montgomery, TX (US); Jeff Quinn, Kingwood, TX (US)

(73) Assignee: ELEMENTS INTERNATIONAL GROUP, LLC, Mesquite, TX (US)

( * ) Notice: Subject to any disclaimer, the term of this patent is extended or adjusted under 35 U.S.C. 154(b) by 178 days.

(21) Appl. No.: 17/500,701

(22) Filed: Oct. 13, 2021

(65) Prior Publication Data

US 2022/0110455 A1 Apr. 14, 2022

Related U.S. Application Data

(60) Provisional application No. 63/242,944, filed on Sep. 10, 2021, provisional application No. 63/213,135, filed on Jun. 21, 2021, provisional application No. 63/091,225, filed on Oct. 13, 2020.

(51) Int. Cl.

| | |
|---|---|
| ***A47C 27/14*** | (2006.01) |
| ***A47C 27/08*** | (2006.01) |
| ***A47C 27/15*** | (2006.01) |
| ***A47C 27/16*** | (2006.01) |
| ***B68G 7/00*** | (2006.01) |

(52) U.S. Cl.
CPC .......... *A47C 27/144* (2013.01); *A47C 27/085* (2013.01); *A47C 27/148* (2013.01); *A47C 27/15* (2013.01); *A47C 27/16* (2013.01); *B68G 7/00* (2013.01)

(58) Field of Classification Search
CPC ... A47C 27/144; A47C 27/085; A47C 27/148; A47C 27/15; A47C 27/16; A47C 27/14; C08L 53/025
See application file for complete search history.

(56) References Cited

U.S. PATENT DOCUMENTS

| | | | | |
|---|---|---|---|---|
| 6,187,837 | B1 * | 2/2001 | Pearce | A43B 13/04<br>524/579 |
| 8,424,137 | B1 * | 4/2013 | Pearce | A47C 27/085<br>5/655.5 |
| 2012/0244312 | A1 | 9/2012 | Pearce et al. | |
| 2015/0335498 | A1 | 11/2015 | Hubbard, Jr. et al. | |

(Continued)

FOREIGN PATENT DOCUMENTS

DE 202006018741 U1 * 6/2007 .......... A47C 27/144

OTHER PUBLICATIONS

PCT International Search Report from co-pending PCT Application No. PCT/US21-054863; Int'l filing date Oct. 13, 2021; 2 pages.

*Primary Examiner* — Justin C Mikowski
*Assistant Examiner* — Alison N Labarge
(74) *Attorney, Agent, or Firm* — Braxton Perrone, PLLC; Gregory Perrone; Bobby W. Braxton

(57) ABSTRACT

A body support structure comprising a gel layer comprising at least a first gel lattice, wherein the first gel lattice comprises a plurality of first gel segments, wherein the plurality of first gel segments defines a plurality of first gaps; and a viscoelastic foam layer; wherein the gel layer is directly laminated to the viscoelastic foam layer. Methods of forming the gel layers and body support structures comprising the gel layers. Systems for manufacturing body support structures comprising the gel layers.

18 Claims, 11 Drawing Sheets

(56) References Cited

U.S. PATENT DOCUMENTS

| | | | | |
|---|---|---|---|---|
| 2017/0224126 | A1* | 8/2017 | O'Connell, Jr. | A47G 9/10 |
| 2017/0254379 | A1* | 9/2017 | Whatcott | A47C 27/00 |
| 2019/0150632 | A1* | 5/2019 | Pearce | A47C 27/064 |
| 2021/0317314 | A1* | 10/2021 | Seliskar | B60N 3/042 |

* cited by examiner

GEL LAMINATION TO VISCOELASTIC FOAM

CROSS-REFERENCE TO RELATED APPLICATIONS

The present application claims the benefit under 35 U.S.C. § 119(e) of prior-filed copending provisional applications 63/091,225, filed Oct. 13, 2020; 63/213,135, filed Jun 21, 2021, and 63/242,944, filed Sep. 10, 2021.

FIELD OF THE INVENTION

Generally, the present disclosure relates to body support structures, such as mattresses, mattress toppers, cushions, pillows, and the like, comprising a gel layer directly laminated to a viscoelastic foam layer.

DESCRIPTION OF THE RELATED ART

Foam body support structures, e.g., pillows, cushions, mattress toppers, and mattresses, such as viscoelastic or so-called "memory foam" mattresses, provide desirably high levels of firmness and support for many users. However, mattresses comprising only viscoelastic foam may lack sufficient support for some users.

Gel materials, for example, those incorporated into mattresses and/or mattress toppers marketed under the name GelFlex™ (Purple Innovation, LLC, Lehi, Utah), may provide some support for some users. However, some users may prefer mattresses comprising both gel materials and viscoelastic foams. Although both gel materials and viscoelastic foams are well known, techniques for incorporating both types into a single mattress or other body support article remain cumbersome.

The present disclosure may address and/or at least reduce one or more of the problems identified above.

SUMMARY OF THE INVENTION

The following presents a simplified summary of the disclosure in order to provide a basic understanding of some aspects of the disclosure. This summary is not an exhaustive overview of the disclosure. It is not intended to identify key or critical elements of the disclosure, or to delineate the scope of the disclosure. Its sole purpose is to present some concepts in a simplified form as a prelude to the more detailed description that is discussed later.

In one embodiment, the present disclosure is directed to a body support structure, comprising: a gel layer comprising at least a first gel lattice, wherein the first gel lattice comprises a plurality of first gel segments, wherein the plurality of first gel segments define a plurality of first gaps; and7 a viscoelastic foam layer; wherein the gel layer is directly laminated to the viscoelastic foam layer.

In one embodiment, the present disclosure is directed to a method, comprising: forming a gel layer comprising at least a first gel lattice, wherein the first gel lattice comprises a plurality of first gel segments, wherein the plurality of first gel segments define a plurality of first gaps; forming a viscoelastic foam layer; and laminating the gel layer to the viscoelastic foam layer.

In one embodiment, the present disclosure is directed to a system, comprising: a manufacturing system configured to: form a gel layer comprising at least a first gel lattice, wherein the first gel lattice comprises a plurality of first gel segments, wherein the plurality of first gel segments define a plurality of first gaps; form a viscoelastic foam layer; and laminate the gel layer to the viscoelastic foam layer.

The present disclosure may provide for body support structures, e.g., pillows, cushions, mattress toppers, and mattresses, combining both gel layers and viscoelastic foam layers.

BRIEF DESCRIPTION OF THE DRAWINGS

The disclosure may be understood by reference to the following description taken in conjunction with the accompanying drawings, in which like reference numerals identify like elements, and in which.

Figure 1:
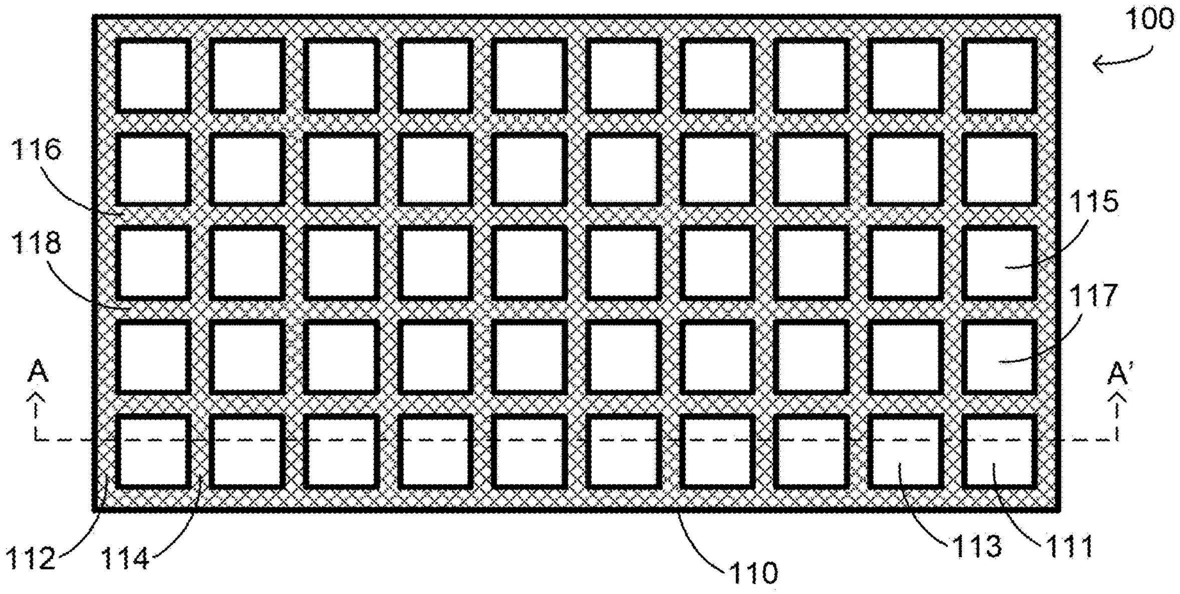
FIG. 1 illustrates a stylized top view of a first mattress, in accordance with embodiments herein.

For the avoidance of doubt, and in accordance with practice before the United States Patent and Trademark Office, none of the present figures are to scale.

While the subject matter disclosed herein is susceptible to various modifications and alternative forms, specific embodiments thereof have been shown by way of example in the drawings and are herein described in detail. It should be understood; however, that the description herein of specific embodiments is not intended to limit the disclosure to the particular forms disclosed, but on the contrary, the intention is to cover all modifications, equivalents, and alternatives falling within the spirit and scope of the disclosure as defined by the appended claims.

INCORPORATION BY REFERENCE

The following United States patents and published applications are hereby incorporated herein by reference.

U.S. Pat. Nos. 10,721,992; 9,775,403; 9,717,304; 9,320,317; 8,434,748; 7,138,079; 7,076,822; 6,865,759; 6,413,458; 6,026,527; 5,994,450; 5,881,409; 5,749,111; 5,626,657; 5,549,743; 5,421,874; 2018/0295941; 2018/0295934; 2015/0230549; 2014/0259748; 2014/0259743.

DETAILED DESCRIPTION

Various illustrative embodiments of the disclosure are described below. In the interest of clarity, not all features of an actual implementation are described in this specification. It will, of course, be appreciated that, in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would be a routine undertaking for those of ordinary skill in the art having the benefit of this disclosure.

The present subject matter will now be described with reference to the attached figures. Various structures, systems and devices are schematically depicted in the drawings for purposes of explanation only and to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Embodiments herein are directed to body support structures comprising one or more structures configured to enhance comfort of a user of the body support structure. Body support structures herein may include, but are not limited to, mattresses, mattress toppers, pillows, cushions, sofas, pet beds, etc.

Turning to FIG. 1, a stylized, nearsighted top view of a gel layer 110 of a body support structure 100, in accordance with embodiments herein, is illustrated. By "nearsighted" is meant that the view is of a single plane of a three-dimensional object, with components of the object behind the plane being omitted for the sake of readability of the view.

Figure 3A:
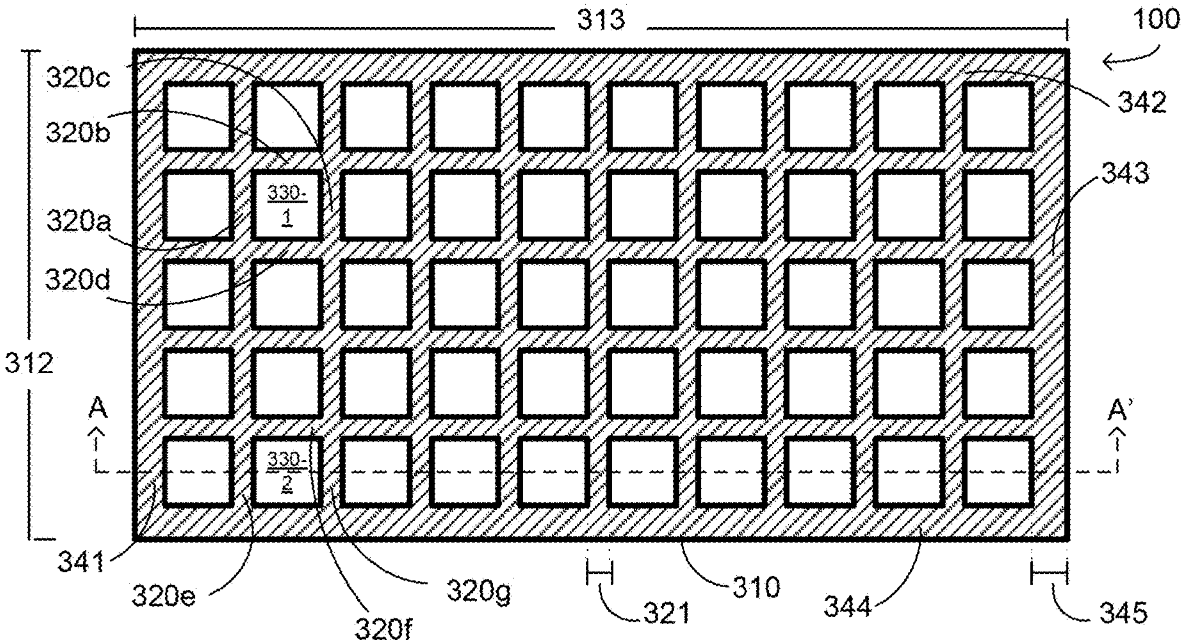
FIG. 3A illustrates a stylized top view of a gel layer, in accordance with embodiments herein.

The body support structure 100 has a generally rectangular profile in top view, i.e., the gel layer 110 and the body support structure 100 are each substantially a rectangular prism. FIG. 3A shows a stylized top view of a gel layer 310 of a particular set of embodiments of the present disclosure. The gel layer 110 and the gel layer 310 have numerous elements in common, and will be discussed together. Generally, any discussion regarding one gel layer 110 or 310 will be applicable to the other gel layer 110 or 310.

The gel layer 110 is formed of a first gel material. "Gel" is a term well-known in the art. More information regarding gel formulations and manufacturing techniques can be found in patents and other literature incorporated herein by reference.

In one embodiment, the gel layer 110 may comprise the following components by weight: Styrene block copolymer 2-80%, plasticized oil 10-90%, thermoplastic polystyrene—polybutadiene-polystyrene block copolymer 5-80%, toner 0.03-3%.

In a further embodiment, the gel layer 110 may comprise an essential oil additive from 0.01%-5% by weight. In one embodiment, the essential oil component of the essential oil additive is selected from the group consisting of green tea oil, sweet orange oil, menthol oil, peppermint oil, cedarwood oil, lemon oil, eucalyptus oil, aromatic litsea/mountain pepper oil, clove oil, spearmint oil, rose oil, lemongrass oil, lavender oil, thyme oil, alfalfa oil, allspice oil, ambrette (seed) oil, angelica root oil, angelica seed oil, angelica stem oil, angostura (cusparia bark) oil, anise oil, asafetida-foetida oil, balm (lemon balm) oil, balsam of peru oil, basil oil, bay leaves oil, bay (myrcia oil) oil, bergamot (bergamot orange) oil, bitter almond oil, bois de rose oil, cacao oil, camomile (chamomile) flowers oil, cananga oil, capsicum oil, caraway oil, cardamom seed (cardamon) oil, carob bean oil, carrot oil, cascarilla bark oil, cassia bark oil, chinese oil, cassia bark oil, padang or batavia oil, cassia bark oil, celery seed oil, cherry oil, wild oil, bark oil, chervil oil, chicory oil, cinnamon bark oil, ceylon oil, chinese oil, saigon oil, cinnamon leaf oil, citronella oil, citrus peels oil, clary (clary sage) oil, clover oil, coca (decocainized) oil, coffee oil, cola nut oil, coriander oil, cumin (cummin) oil, curacao orange peel (orange oil, bit oil, cusparia bark oil, dandelion oil, dandelion root oil, dog grass (quackgrass oil, triticum) oil, elder flowers oil, estragole (esdragol oil, esdragon oil, t oil, estragon (tarragon) oil, fennel oil, sweet oil, fenugreek-gr oil, galanga (galangal) oil, geranium oil, geranium oil, east indian oil, geranium oil, rose oil, ginger oil, grapefruit oil, guava oil, hickory bark oil, horehound (hoarhound) oil, hops oil, horsemint oil, hyssop oil, immortelle oil, jasmine oil, juniper (berries) oil, kola nut oil, laurel berries oil, laurel leaves oil, lavender oil, lavender oil, spike oil, lavandin oil, lemon(l.) burm. oil, lemon balm oil, lemongrass oil, lemon peel(l.) oil, lime oil, linden flowers oil, locust bean oil, oil, lupulin oil, mace oil, mandarin oil, marjoram oil, sweet oil, yerba mate oil, melissa (see balm) oil, menthol oil, menthyl acetate oil, molasses (extract) oil, mustard oil, naringin oil, neroli oil, bigarade oil, nutmeg oil, onion oil, orange oil, bitter oil, flowers oil, orange oil, bitter oil, peel oil, orange leaf(l.) oil, orange oil, sweet oil, orange oil, sweet oil, flowers oil, orange oil, sweet oil, peel oil, origanum oil, palmarosa oil, paprika oil, parsley(mi oil, pepper oil, black oil, pepper oil, white oil, peppermint oil, peruvian balsam oil, petitgrain oil, petitgrain lemon oil, petitgrain mandarin or tangerine oil, pimenta oil, pimenta leaf oil, pipsissewa leaves oil, pomegranate oil, prickly ash bark oil, rose absolute oil, rose (otto of roses oil, attar of roses) oil, rose buds oil, rose flowers oil, rose fruit (hips) oil, rose geranium oil, rose leaves oil, rosemary oil, saffron oil, sage oil, sage oil, greek oil, sage oil, spanish oil, st. john's bread oil, savory oil, summer oil, savory oil, winter oil, schinus molle oil, sloe berries (blackthorn berries) oil, spearmint oil, spike lavender oil, tamarind oil, tangerine oil, tarragon oil, tea oil, thyme oil, thyme oil, white oil, thyme oil, wild or creeping oil, tuberose oil, turmeric oil, vanilla oil, violet flowers oil, violet leaves oil, violet leaves absolute oil, wild cherry bark oil, ylang-ylang oil, and zedoary bark oil.

In one embodiment, the essential oil is green tea oil, which may be present at 0.3 wt %.

The gel layer 110 comprises a plurality of ridges, such as specifically identified ridges 112, 114, 116, 118. The plurality of ridges 112-118 have a first height. The gel layer 110 also comprises a plurality of valleys, such as specifically identified valleys 111, 113, 115, 117. The plurality of valleys 111-117 have a second height below the first height.

The gel layer 110 may be considered to resemble a waffle, though this resemblance must not be construed as limiting the gel layer 110.

In the depicted embodiment of FIG. 1, the gel layer 110 comprises square valleys 111-117. However, the shape of the valleys 111-117 may vary. In other embodiments, not shown but immediately apparent to the person of ordinary skill in the art having the benefit of the present disclosure, the valleys 111-117 may have shapes selected from the group consisting of squares, rectangles, diamonds, parallelograms, other quadrilaterals, polygons with other than four sides, circles, ellipses, and other curved shapes.

FIG. 1 shows all ridges 112-118 and all valleys 111-117 as being uniformly sized, spaced, and shaped. In other embodiments, not shown for brevity, one or more ridges 112-118 etc. and/or one or more valleys 111-117 etc. may differ from other ridges/valleys in one or more of size, shape, and/or spacing.

Figure 2:
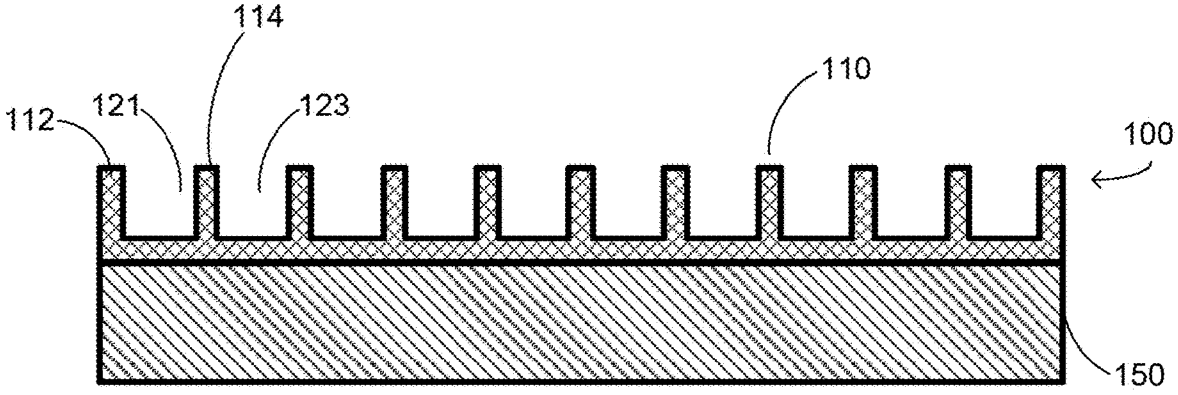
FIG. 2 illustrates a stylized cross-sectional view of the first mattress of FIG. 1 taken along the A-A' line in FIG. 1, in accordance with embodiments herein.

The first and second heights referred to above may be readily seen in FIG. 2, which is a cross-sectional view of the body support article 100 comprising gel layer 110 taken along the A-A' line in FIG. 1. The tops of ridges 112, 114 are clearly above the bottoms of the valleys 121, 123. In the embodiment of FIG. 2, the valleys 121, 123, etc. are not filled. In another embodiment, not shown, at least one of the valleys may be filled with a second material to yield filled valley(s). The second material may be a polymeric material, such as polyurethane; a viscoelastic material; a non-viscoelastic material; an elastomeric material; a gel; any material disclosed by any document incorporated herein by reference; or the like. When one, some, or all valleys are filled, they may be filled to different depths and/or some may extend above the height of one or more ridges.

FIG. 2 shows all ridges 112-114 etc., and all valleys 121-123 etc., as having uniform heights. In other embodiments, not shown for brevity, one or more ridges 112-114 etc., and/or one or more valleys 121-123 etc. may differ from other ridges/valleys in height.

Figure 3B:
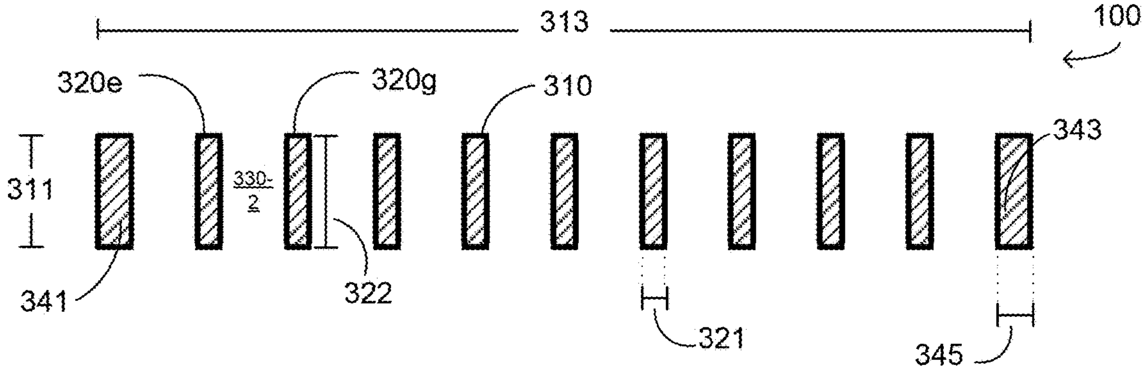
FIG. 3B illustrates a stylized nearsighted side cross-sectional view of the gel layer of FIG. 1A along line A-A', in accordance with embodiments herein.

FIG. 3A depicts a nearsighted top view of a gel layer 310, and FIG. 3B illustrates a stylized nearsighted side cross-sectional view of the gel layer 310 of FIG. 3A along line A-A'. The gel layer 310 having a rectangular prism shape having a gel layer height 311, a gel layer width 312, and a gel layer length 313. The "width" and the "length" may be arbitrarily selected, each from an opposed pair of sides of the rectangular prism. Typically, and particularly for embodiments wherein the gel layer 300 is intended to top at least about half of a body support article, the width and height may be selected such that the gel layer width 312 is less than the gel layer length 313.

Regardless how the width and height are assigned, the gel layer height 311 is no more than one-third of the shorter of the gel layer width 312 and the gel layer length 313. In other words, the gel layer 310 is much shorter than it is long and wide.

In embodiments, the gel layer height may be from about 0.25" (0.64 cm) to about 1" (2.54 cm). In a particular embodiment, the gel layer height may be about 0.5" (1.27 cm).

The gel layer 310 comprises a plurality of first gel segments, collectively and/or generically 320, with individual first gel segments 320*a*, 320*b*, 320*c*, 320*d*, 320*e*, 320*f*, and 320*g* specifically identified in FIG. 3A and FIG. 3B. The definition of "segments" is arbitrary, in that the gel layer 310 is essentially integral. Generally, each first gel segment 320 has a first segment height 322 essentially equal to the gel layer height 311, and a first segment thickness 321 less than the first segment height 322.

The first gel segments 320 define a plurality of first gaps, collectively and/or generically 330, with individual first gaps 330-1 and 330-2 specifically identified in FIG. 3A and FIG. 3B. In FIG. 3A and FIG. 3B, the first gap 330-1 is defined by first gel segments 320*a,* 320*b,* 320*c,* and 320*d.* The first gap 330-2 is defined by first gel segments 320*e,* 320*f,* and 320*g,* along with a perimeter segment 344 to be described later.

Generally, a "gap" 330 in FIG. 3A and FIG. 3B is substantially the same as a "valley" 111, 113, 115, 117 in FIG. 1-FIG. 2. The two terms "gap" and "valley" may be used interchangeably herein.

Accordingly, a "segment" may be considered as a portion of the gel layer 310 that separates any two adjacent first gaps 330. Each first gap 330 has a first size and a first shape. The shape is defined herein by reference to two-dimensional figures as seen from a top view. For example, the first gaps 330 depicted in FIG. 3A, e.g., first gaps 330-1 and 330-2 each have a square shape. The size of the first gaps 330 may also be varied, with "size" here referring to the lengths of the gel segments 320 defining each first gap 330 and the surface area of the shape.

The square shape of the first gaps 330 in FIG. 3A is merely exemplary. Any one or more of a wide range of shapes may be considered. In one embodiment, the first gaps 330 may each have a first size and a first shape selected from the group consisting of squares, rectangles, diamonds, parallelograms, other quadrilaterals, triangles, polygons with other than four sides, circles, ellipses, raindrops, and other curved shapes.

Figure 4:
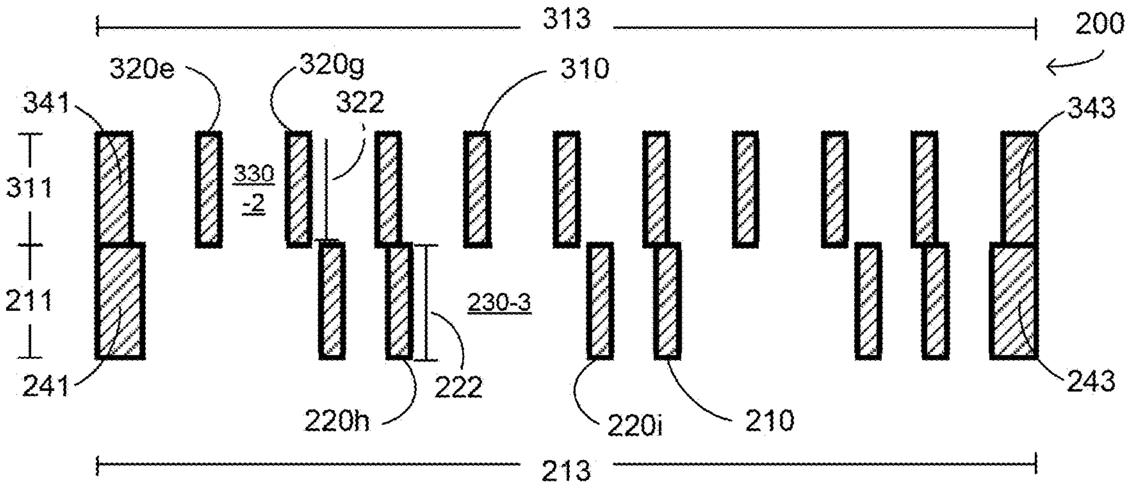
FIG. 4 illustrates a stylized nearsighted side cross-sectional view of a gel layer comprising two gel lattices, in accordance with embodiments herein.

Turning to FIG. 4, a nearsighted side view of a gel layer 200 is shown. FIG. 4 shows numerous elements identical to or similar to those shown in FIG. 1-FIG. 3B. Typically, such similar elements will be identified by reference numerals having common ones and tens digits, and differing by a "1" or a "2" hundreds digit. For example, FIG. 4 shows a first gel lattice 310 and a second gel lattice 210. The second gel lattice 210 comprises second gel segments 220, similar to first gel segments 320. For the sake of brevity, identical and similar elements will not be described again, and description of elements of FIG. 4 will focus on differences and new aspects relative to those shown and described regarding FIG. 1-FIG. 3B.

As mentioned above, the gel layer 200 comprises a second gel lattice 210. The second gel lattice 210 may comprise any gel, such as the gel formulation set forth above.

The second gel lattice 210 has a second gel lattice height 211, which may but need not be equal or essentially equal to the first gel lattice height 111. The second gel lattice 210 comprises second gel segments 220, e.g. second gel segments 220*h* and 220*i,* which define a plurality of second gaps, e.g., 230-3. The second gaps 230 can be as described above. The second gel lattice 210 has a second firmness in a direction parallel to the second gel lattice height 211.

In one embodiment, the first gel lattice width 112 is essentially equal to the second gel lattice width, and the first gel lattice length 113 is essentially equal to the second gel lattice length 213.

The second gaps 230 may have any shape(s) and size(s) described above. Desirably, the second gaps 230 are generally different in shape(s) and/or size(s) than the first gaps 130. Though not to be bound by theory, different shape(s) and/or size(s) may impart a number of desirable properties to the gel layer 200.

First, the first gel lattice 110 and the second gel lattice 210 will tend to have different firmnesses, such that the firmness of the gel layer 200 perceived by a user will heavily depend on which of the first gel lattice 110 and the second gel lattice 210 is uppermost, i.e., is closest to a user's body when seated or reclined on a body support article comprising the gel layer 200 as an uppermost layer. The gel layer 200 may conveniently provide a choice of firmnesses by arranging one or the other of the first gel lattice 110 and the second gel lattice 210 as an uppermost layer. This may be done in manufacturing or, if the gel layer 200 and a body support article comprising it are so configured, by the user.

A second desirable property is that one or more first spaces 130 may be continuous with one or more second spaces 230. This may allow improved air flow and/or heat dissipation from the user's body, thereby reducing the user's perception of "sleeping hot."

In a particular embodiment, in the gel layer 200, each of the plurality of first gaps 130 may have a diamond shape; and each of the plurality of second gaps 230 may have a convex pentagon shape that is neither equilateral nor equiangular. The firmness of the first gel lattice 110 may be less than the firmness of the second gel lattice 210.

The gel layer 200 may comprise four layer perimeter segments, each layer perimeter segment having a layer perimeter segment height essentially equal to the sum of the first gel lattice height and the second gel lattice height, and a layer perimeter segment thickness greater than greater of the first gel segment thickness and the second gel segment thickness, with each layer perimeter segment being essentially coincident with the union of one and only side of the first gel lattice perpendicular to the direction parallel to the first gel lattice height and one and only side of the second gel lattice perpendicular to the direction parallel to the second gel lattice height.

In the gel layer 200, all of the first gel lattice 110, the second gel lattice 210, and all lattice and layer perimeter segments may comprise a common gel formulation, such as that described above. In one embodiment, the common gel formulation comprises by weight: Styrene block copolymer 2-80%, plasticized oil 10-90%, thermoplastic polystyrene—polybutadiene-polystyrene block copolymer 5-80%, and green tea oil 0.3%.

Figure 5:
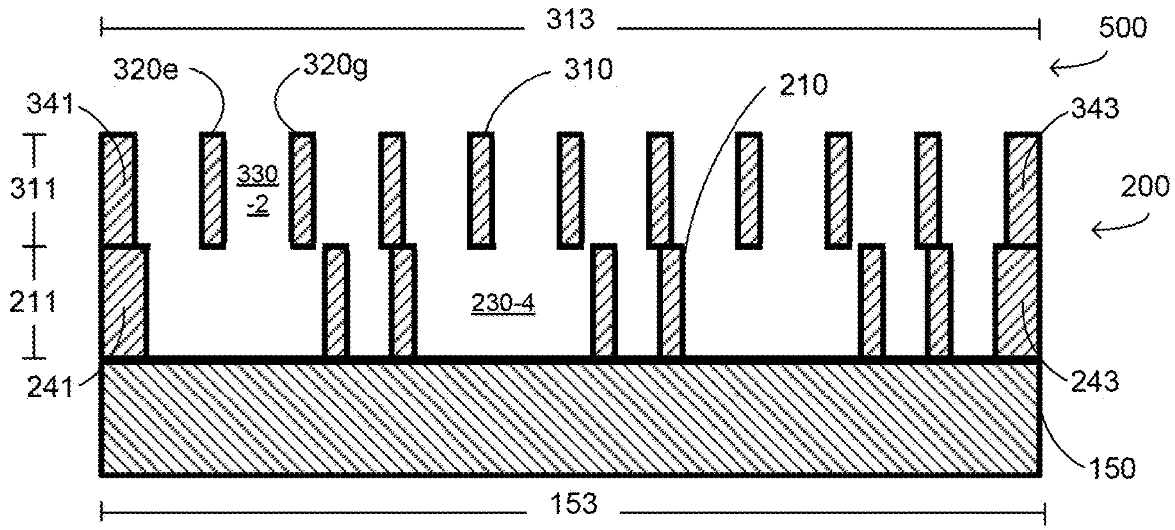
FIG. 5 illustrates a stylized nearsighted side cross-sectional view of a body support article comprising a gel layer comprising two gel lattices, in accordance with embodiments herein.

Turning to FIG. 5, a stylized nearsighted side cross-sectional view of a body support article 500, in accordance with embodiments herein, is illustrated. The body support article 500 may have a generally rectangular profile in top view (not shown). For example, the body support article 500 may be a mattress.

Figure 6:
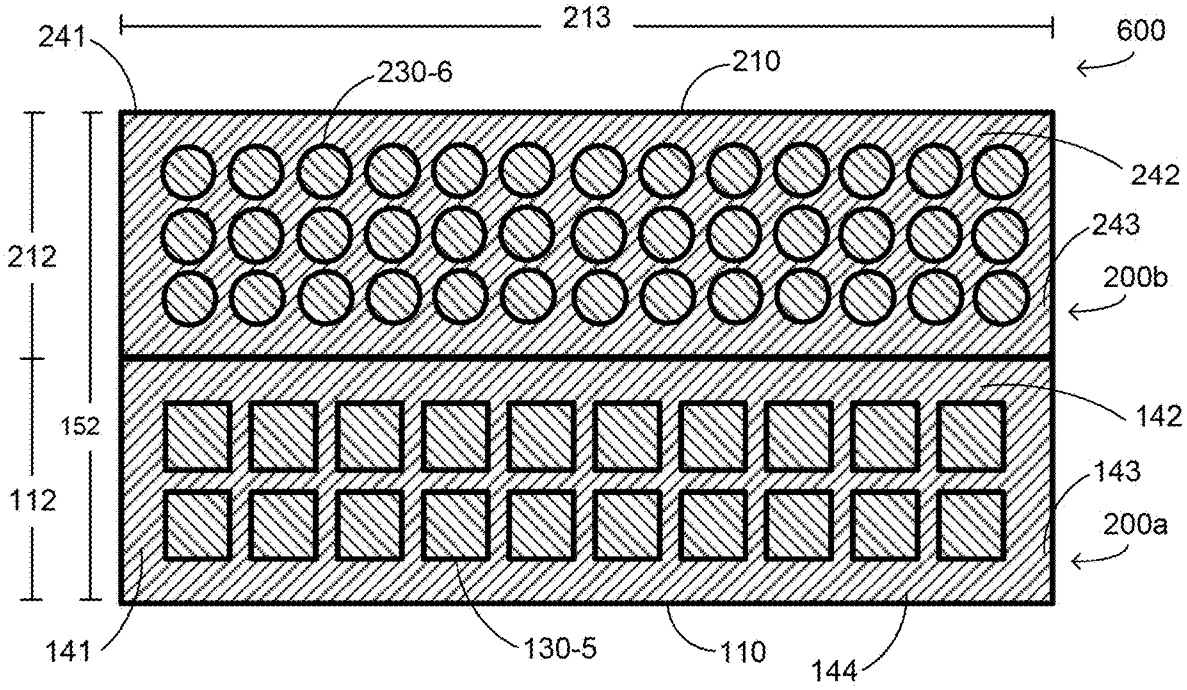
FIG. 6 illustrates a stylized top view of a body support article comprising two gel layers, one disposed on the left half of the body support article and the other disposed on the right half of the body support article, in accordance with embodiments herein.

FIG. 6 shows a top view of a body support article 600. FIG. 5-FIG. 6 have much in common and will generally be described together.

As shown in FIG. 5 and FIG. 6, the body support article 500 may comprise a viscoelastic foam layer 150 having a rectangular prism shape having a viscoelastic foam layer width 152 and a viscoelastic foam layer length 153, and gel layer 200 above and directly laminated to the viscoelastic foam layer 150.

The viscoelastic foam layer 150 may comprise any appropriate material. The material may be a polymeric material, such as polyurethane; a viscoelastic material; a non-viscoelastic material; an elastomeric material; a gel; any material disclosed by any document incorporated herein by reference; or the like.

The gel layer 100 or 200 is as described above.

In one embodiment, as depicted in FIG. 6, the viscoelastic foam layer width 152 is essentially equal to the sum of the first gel lattice width 112 and the second gel lattice width 212, and body support article comprises two instances of the gel layer, e.g., first instance a of gel layer 200 (reference numeral 200*a*) and second instance b of gel layer 200 (reference numeral 200*b*), wherein the first instance 200*a* of the gel layer 200 is positioned on and aligned with a left half of the viscoelastic foam layer 150 and a second instance 200*b* of the gel layer 200 is positioned on and aligned with a right half of the viscoelastic foam layer 150. As is customary in the body support article arts, "left" and "right" refer to halves of a top surface of the body support article 600 or a layer thereof as seen by the person of ordinary skill in the art standing at the foot of a piece of furniture comprising the body support article 600. For most body support articles, "left" and "right" are arbitrary, as in either half of the top surface of the body support article may be left or right, unless the body support article is constructed such that one end is intended for supporting a user's head and upper torso and the opposite end is intended for supporting the user's lower legs and feet.

In FIG. 6, the first instance 200*a* of the gel layer is positioned with the first gel lattice 110 uppermost. In the first instance 200*a,* the first spaces 130 have first shapes, e.g., square shapes in the depicted embodiment. The second instance 200*b* of the gel layer is positioned with the second gel lattice 210 uppermost. In the second instance 200*b,* the second spaces 230 have second shapes, e.g., circular shapes in the depicted embodiment. Of course, in view of the above discussion of first spaces 130 and second spaces 230, the person of ordinary skill in the art will understand that the first spaces 130 and the second spaces 230 may have any shape.

By having different shapes 130, 230 in their uppermost gel lattices 110, 210, the first instance 200*a* and the second instance 200*b* of the gel layer 200 will tend to have different firmnesses as perceived by a user of the body support article 600. Accordingly, if the first member of a couple sharing a bed expresses a preference for a first firmness perceived when the first gel lattice 110 is uppermost, and the second member of the couple expresses a preference for a second firmness perceived when the second gel lattice 210 is uppermost, the particular instance of the gel layer 200 to be positioned on their preferred side of the bed may be oriented such that the gel lattice 110, 210 having their preferred firmness is uppermost. This positioning may be effected during manufacturing, as will be discussed hereinafter, or upon the couple's taking of possession of the body support article 600.

In other embodiments, the body support article 500 or 600 may further comprise at least one layer below the viscoelastic foam layer 150 and/or at least one layer above a/the gel layer(s) 200.

Any layer(s) above or below the gel layer 200 and t viscoelastic foam layer 150 may be formed of any appropriate material, such as a polymeric material, such as polyurethane; a viscoelastic material; a non-viscoelastic material; an elastomeric material; a gel; any material disclosed by any document incorporated herein by reference; or the like. The various layers may be bonded together by any suitable adhesive, may be coextruded, or may be fabricated and/or assembled using any process and/or equipment known in the art.

Figure 7A:
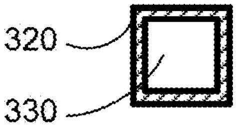
FIG. 7A illustrates a stylized top plan view of a first gel space, in accordance with embodiments herein.
Figure 7B:
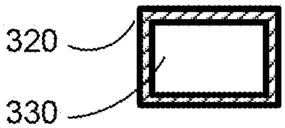
FIG. 7B illustrates a stylized top plan view of a second gel space, in accordance with embodiments herein.
Figure 7C:
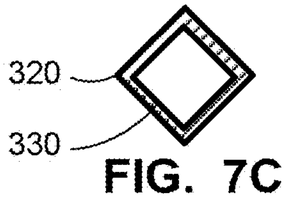
FIG. 7C illustrates a stylized top plan view of a third gel space, in accordance with embodiments herein.
Figure 7D:
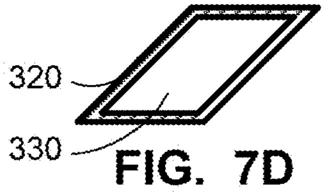
FIG. 7D illustrates a stylized top plan view of a fourth gel space, in accordance with embodiments herein.
Figure 7E:
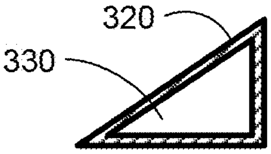
FIG. 7E illustrates a stylized top plan view of a fifth gel space, in accordance with embodiments herein.
Figure 7F:
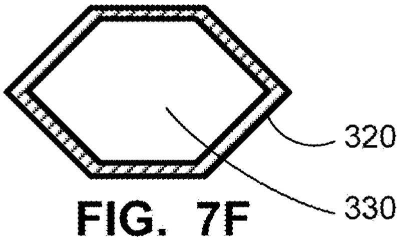
FIG. 7F illustrates a stylized top plan view of a sixth gel space, in accordance with embodiments herein.
Figure 7G:
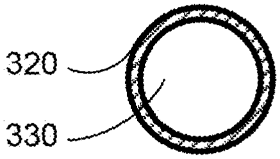
FIG. 7G illustrates a stylized top plan view of a seventh gel space, in accordance with embodiments herein.
Figure 7H:
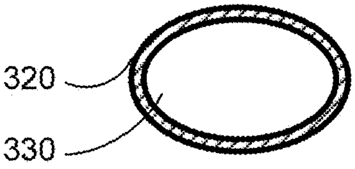
FIG. 7H illustrates a stylized top plan view of an eighth gel space, in accordance with embodiments herein.
Figure 7I:
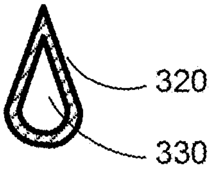
FIG. 7I illustrates a stylized top plan view of a ninth gel space, in accordance with embodiments herein.

FIG. 7A-FIG. 7K show particular top views of individual first gaps 330 that may be used in the gel layer 100 or 200. In one embodiment, each first gap 330 has a shape in top view selected from the group consisting of squares, rectangles, diamonds, parallelograms, other quadrilaterals, triangles, polygons with other than four sides, circles, ellipses, raindrops, and other curved shapes. For example, in FIG. 7A, the first gap 330 has a square shape in top view, with the understanding the square is oriented such that all of the gel segments 320 are parallel to a side of the gel lattice. In FIG. 7B, the first gap 330 has a rectangular shape in top view. In FIG. 7C, the first gap 330 has a square shape in top view, with the understanding the square is oriented such that none of the gel segments 320 are parallel to any side of the gel lattice. In FIG. 7D, the first gap 330 has a parallelogram shape in top view. In FIG. 7E, the first gap 330 has a triangular shape in top view. In FIG. 7F, the first gap 330 has a hexagonal shape in top view. In FIG. 7G, the first gap 330 has a circular shape in top view. In FIG. 7H, the first gap 330 has an elliptical shape in top view. In FIG. 7I, the first gap 330 has a raindrop shape in top view.

Figure 7J:
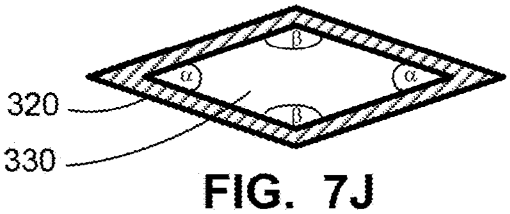
FIG. 7J illustrates a stylized top plan view of a tenth gel space, in accordance with embodiments herein.

In FIG. 7J, the gap 330 has a diamond shape in top view. By "diamond" herein is meant a quadrilateral defined by four gel segments 320, wherein each of the gel segments 320 has the same length. The four gel segments 320 define four corners, each with an interior vertex angle $\alpha$ or $\beta$, with vertex angles $\alpha$ being at a first pair of opposed corners and vertex angles $\beta$ being at a second pair of opposed corners. Generally, $\alpha$ is less than 90° and $\beta$ is more than 90°, with the proviso that $\alpha+\beta=180°$. In one embodiment, a is from 45° to 85° and $\beta$ is from 95° to 135°.

Though not to be bound by theory, we have observed that a gel layer 310 comprising diamond-shaped first gaps 330 tends to be plush, i.e., is relatively not firm. It also tends to have greater strength at the joints between first gel segments 320 than square-shaped gaps, i.e., first gel segments 320 are less likely to tear or otherwise suffer damage at joints when the first gaps 330 are diamond-shaped.

Figure 7K:
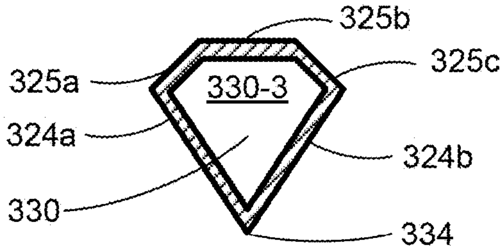
FIG. 7K illustrates a stylized top plan view of an eleventh gel space, in accordance with embodiments herein.

In FIG. 7K, the gap 330-3 has a convex pentagon shape that is neither equilateral nor equiangular. In the specific embodiment shown in FIG. 7K, the convex pentagon shape is defined by two consecutive first gel segments 324*a,* 324*b,* each having a length equal to a first length, and three consecutive first gel segments 325*a,* 325*b,* and 325*c,* each having a length equal to a second length less than the first length.

Figure 7L:
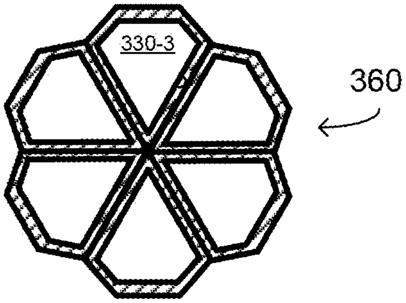
FIG. 7L illustrates a stylized top plan view of a rosette comprising six instances of the eleventh gel space of FIG. 7K, in accordance with embodiments herein.

One property of interest of the convex pentagon shape that is neither equilateral nor equiangular is shown in FIG. 7L. In FIG. 7L, six of the convex pentagon shapes 330-3 form a rosette 360 with 6-fold rotational symmetry around a vertex of the two consecutive first gel segments having the first length. The precise values of the first length and the second length may be selected such that the rosette 360 may tile the gel layer 310.

Though not to be bound by theory, we have observed that a gel layer 310 comprising first gaps 330 with a convex pentagon shape that is neither equilateral nor equiangular, with the first gaps 330 arranged in rosettes 360 tiling the gel layer 310, are relatively firm while providing improved pressure relief relative to first gaps 330 with hexagonal shapes.

Accordingly, in one embodiment of the gel layer 310, all the first gaps 330 have an identical shape selected from diamonds and convex pentagons that is neither equilateral nor equiangular.

Although FIG. 7A and FIG. 7B depict all first gaps 330 as having the same square shape, in other embodiments, the plurality of first gaps 330 may comprise gaps 330 of two or more shapes. Generally, one, two, or more shapes may be chosen to give the gel layer 310 a tiled appearance (i.e., the gaps 330 substantially fill a top view such as FIG. 7A without overlaps or omitted spaces).

FIG. 2 shows each valley 111, 113, 115, 117, 121, 123, etc. of the gel layer 110 as having a closed floor, e.g., the gel layer 110 is continuous under valley 121 between segments 112 and 114. FIG. 3B shows each gap/valley 320 of the gel layer 310 as having an open floor, e.g., the gel layer 310 is discontinuous under gap 330-2 between segments 320*e* and 320*g*. In any embodiment, the floor under none, one, some, or all gaps/valleys may be open and the floor under none, one, some, or all other gaps/valleys may be closed.

Typically, the one, two, or more shapes may form a single tiling pattern, such as is shown in FIG. 3A, but in other embodiments, not shown, the shapes may be varied at different regions of the top surface of the gel layer 310.

The person of ordinary skill in the art will bear in mind that referring to the shapes of the first gaps 330 with geometric terms represents an idealization. In practice, the first gaps 330 may essentially or substantially have a given shape, bearing in mind routine processing variations, minimal processing defects, and other factors that will be apparent to the person of ordinary skill in the art having the benefit of the present disclosure.

The gel layer 310 has a first firmness in a direction parallel to the viscoelastic foam layer height, i.e., substantially in the line of sight of the reader looking at FIG. 3A. Though not to be bound by theory, the value of the first firmness may vary depending on one or more of the formulation of the gel in the gel layer 310, the height 311 of the viscoelastic foam layer, the thickness 321 of the first gel segments 320, and the shape of the first gaps 330, among other structural properties that will be apparent to the person of ordinary skill in the art having the benefit of the present disclosure.

The first firmness does not necessarily have the same value at all points on the top surface of the gel layer 310. Variation in shape and size of first gaps 330 in one or more regions of the gel layer 310 may be chosen to provide regions of the gel layer 310 having slightly greater or slightly lesser firmness than other regions. When we use the term "a firmness" of the gel layer 310 or another structure, we refer to a surface-area weighted average of the precise firmness of all regions of the structure.

The gel layer 300 shown in FIG. 3A and FIG. 3B further comprises four first perimeter segments 341, 342, 343, and 344. Each first perimeter segment 341-344 has a first perimeter segment height essentially equal to the gel layer height 311, and a first perimeter segment thickness 345 equal to or greater than the first gel segment thickness 321. As can most readily be seen in FIG. 3A, each first perimeter segment 341-344 is essentially coincident with one and only side of the gel layer 310 perpendicular to the direction parallel to the viscoelastic foam layer height.

Though not to be bound by theory, perimeter segments 341-344 may increase edge strength of the gel layer 310, thereby reducing buckling of the gel layer 310 around the perimeter and maintaining a desired level of firmness.

Figure 8:
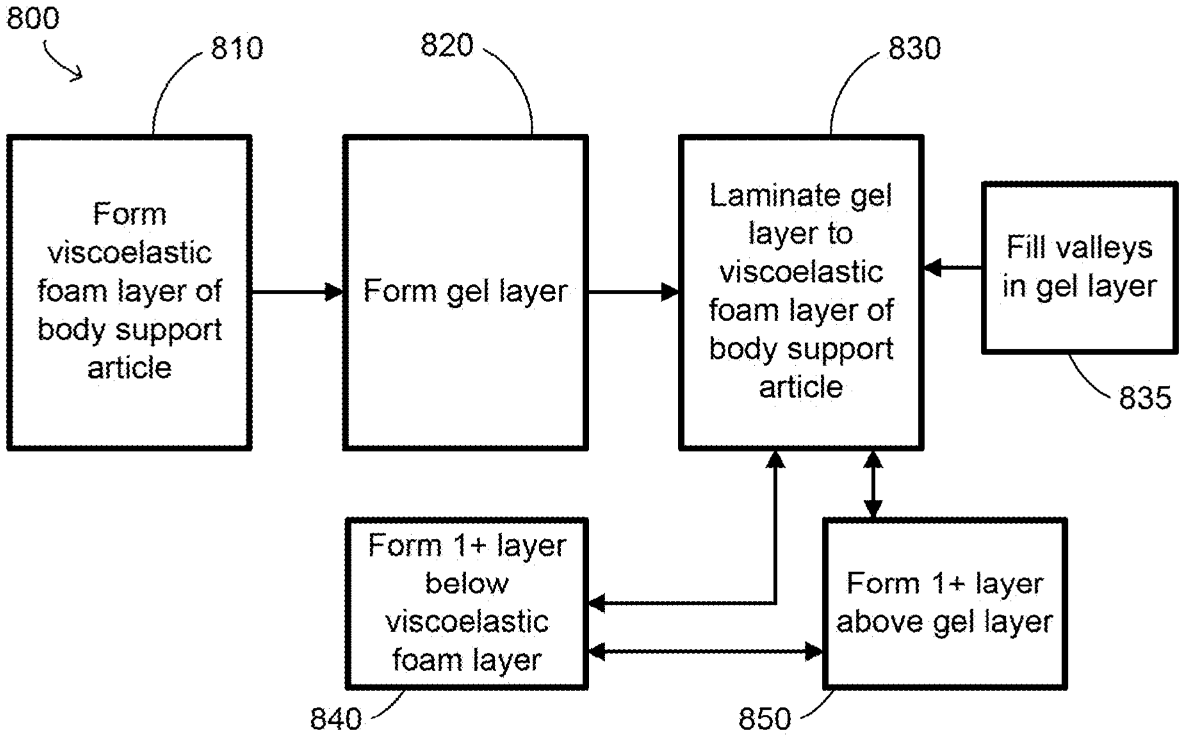
FIG. 8 provides a flowchart of a method, in accordance with embodiments herein.

Turning to FIG. 8, a flowchart of a method 800 is shown. The method 800 comprises forming (at 810) a viscoelastic foam layer of a body support article. In embodiments, the viscoelastic foam layer may have a rectangular prism shape having a viscoelastic foam layer width and a viscoelastic foam layer length.

The body support article and the viscoelastic foam layer may be as described above. Starting materials, techniques, and apparatus for forming (at 810) the viscoelastic foam layer may depend on the final materials of the formed viscoelastic foam layer, other layers to be produced simultaneously with, before, and/or after forming (at 810) the viscoelastic foam layer, how other layers are to be combined into a final body support article, and considerations of cost and/or process efficiency, among other factors that will be apparent to the person of ordinary skill in the art having the benefit of the present disclosure.

The method 800 also comprises forming (at 820) a gel layer from a first gel material, wherein the gel layer comprises a plurality of ridges at or above a first height and a plurality of valleys at or below a second height below the first height.

Generally, the gel layer may be as described above. Starting materials, techniques, and apparatus for forming (at 820) the gel layer may depend on the formulation of the formed gel layer, other layers to be produced simultaneously with, before, and/or after forming (at 820) the gel layer and/or at later steps of the method 800, how other layers are to be combined into a final body support article, and considerations of cost and/or process efficiency, among other factors that will be apparent to the person of ordinary skill in the art having the benefit of the present disclosure.

In one embodiment, the gel layer may be formed (at 820) by injection molding, wherein a liquid formulation is introduced into a mold that is a three-dimensional negative of the gel layer, the liquid formulation gels to yield the gel layer inside the mold, and the mold is removed to yield the gel layer in a form usable for subsequent elements of the method 800. Selection of process conditions, apparatus, and techniques for injection molding will be a routine matter for the person of ordinary skill in the art having the benefit of the present disclosure.

Figure 23:
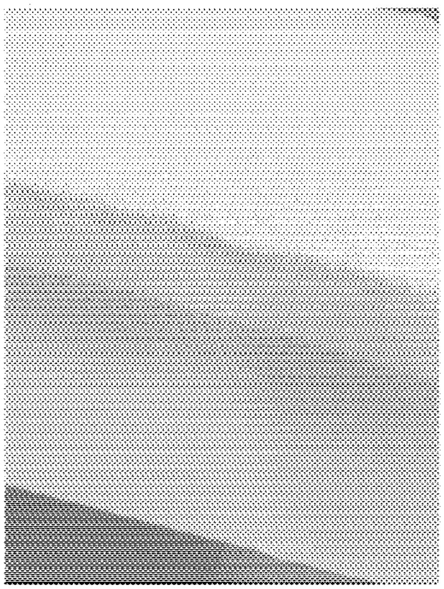
FIG. 23 presents a perspective view of a gel layer laminated to a viscoelastic foam layer, in accordance with embodiments herein.
Figure 24:
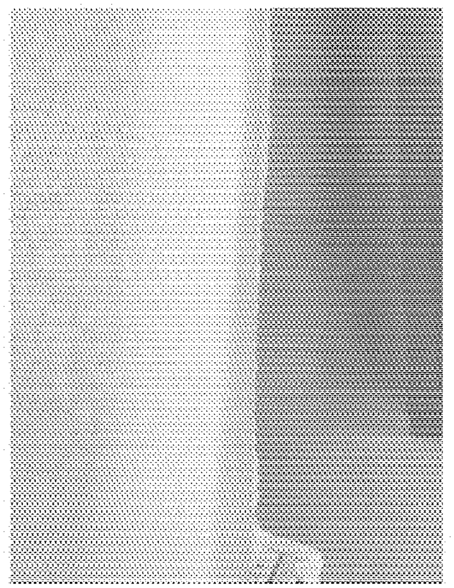
FIG. 24 presents a perspective view of a gel layer laminated to a viscoelastic foam layer, in accordance with embodiments herein.

The method 800 further comprises laminating (at 830) the gel layer to the body support article above the viscoelastic foam layer. Laminating (at 830) may comprise the use of any known adhesive. Laminating (at 830) the gel layer to the viscoelastic foam layer will involve the selection of optimum process conditions and other parameters that will be arrived at through routine experimentation by the person of ordinary skill in the art having the benefit of the present disclosure. Examples of gel layers laminated to viscoelastic foam layer are shown in FIG. 23-FIG. 24.

The method 800 may comprise numerous variations to form body support articles comprising a gel layer above a viscoelastic foam layer having particular properties that may be desirable.

In one embodiment, the method 800 may further comprise filling (at 835) one, some, or all valleys in the gel layer with a second material. This may be performed before, after, or simultaneously with affixing (at 830).

In one embodiment, forming (at 810) the viscoelastic foam layer may comprise forming the viscoelastic foam layer to have a width essentially twice the width of an instance of the gel layer, forming (at 820) may comprise forming two instances of the gel layer differing in one or more properties, such as gel segment thickness, gap/valley shape, gap/valley size, etc., and affixing (at 830) may comprise positioning a first instance of the gel layer on and aligned with a left half of the viscoelastic foam layer and positioning a second instance of the gel layer on and aligned with a right half of the viscoelastic foam layer. In a particular further embodiment of forming (at 820) two instances of the gel layer, the forming (at 820) may impart to the first instance of the gel layer a firmness different from a firmness of the second instance of the gel layer.

Alternatively, or in addition, the method 800 may further comprise forming (at 840) at least one layer below the viscoelastic foam layer. Alternatively, or in addition, the method 800 may further comprise forming (at 850) at least one layer above the gel layer. The at least one layer below the viscoelastic foam layer and the at least one layer above the gel layer may be as described above. The person of ordinary skill in the art having the benefit of the present disclosure will readily be able to form such layers (at 840 and/or 850) using known apparatus, process conditions, and techniques.

Figure 9:
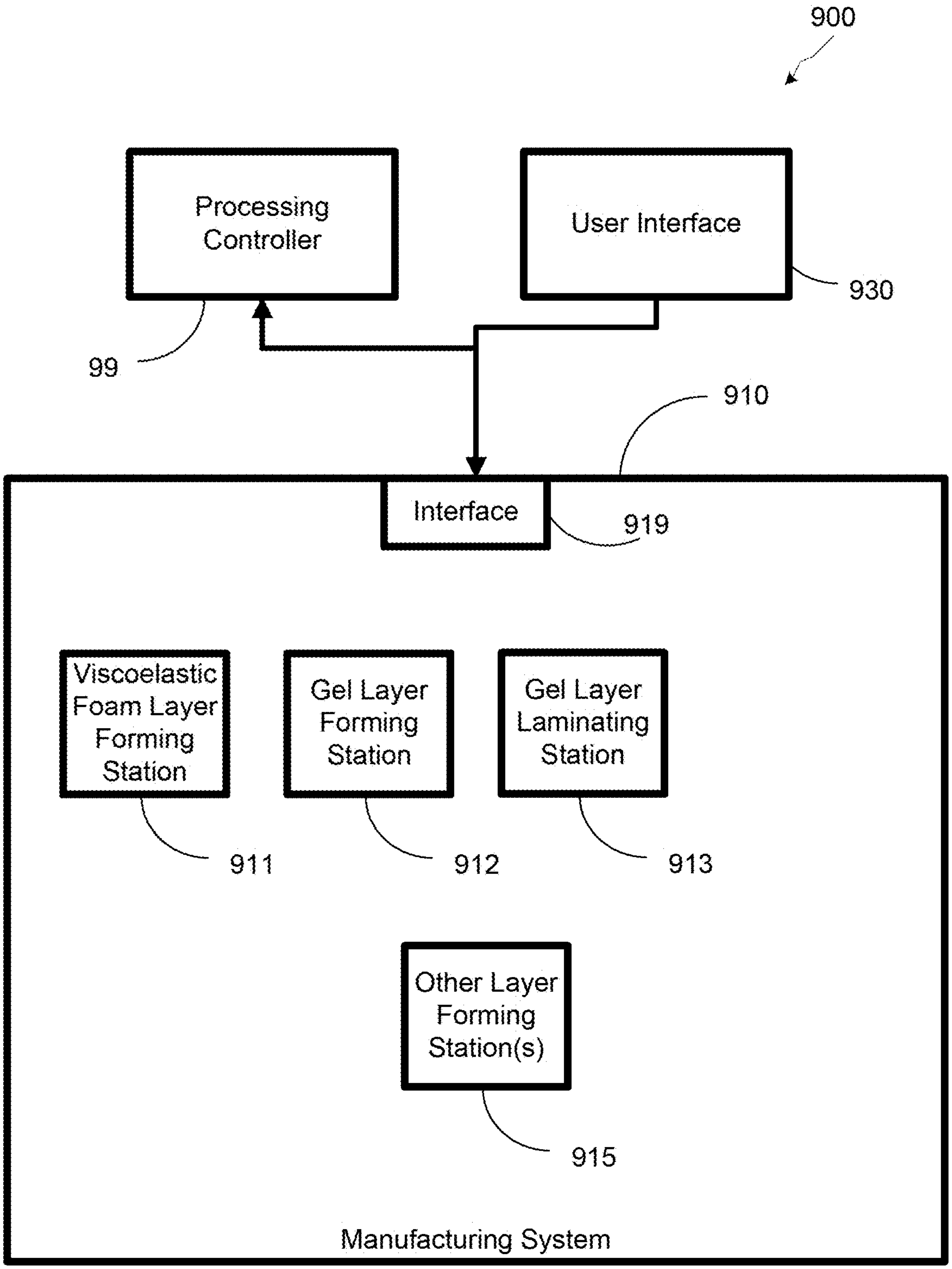
FIG. 9 conceptually depicts a manufacturing system, in accordance with embodiments herein.
Figure 10:
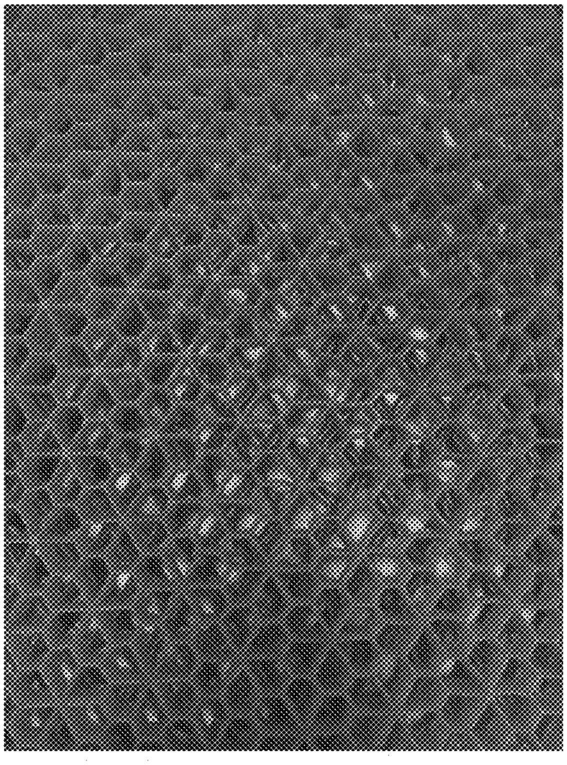
FIG. 10 presents a substantially top view of a portion of a gel layer comprising the gel space of FIG. 7K, in accordance with embodiments herein.
Figure 11:
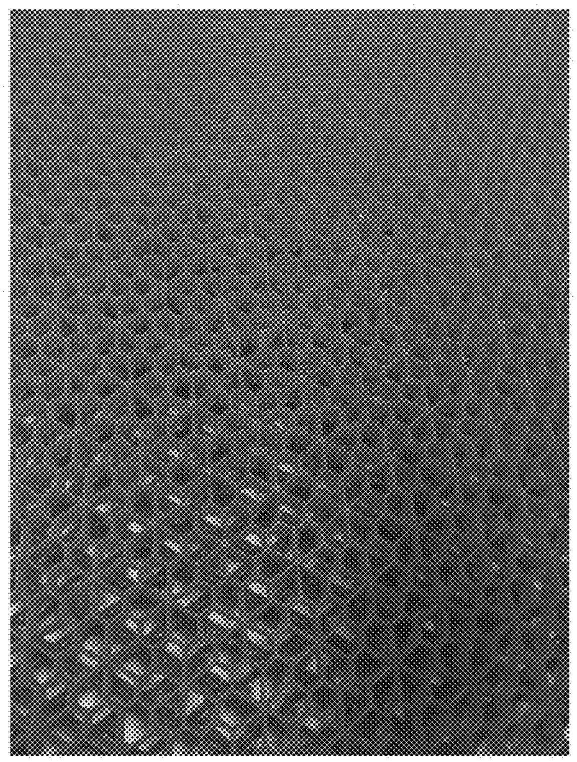
FIG. 11 presents a substantially top view of a portion of a gel layer comprising the gel space of FIG. 7K in the rosette of FIG. 7L, in accordance with embodiments herein.
Figure 12:
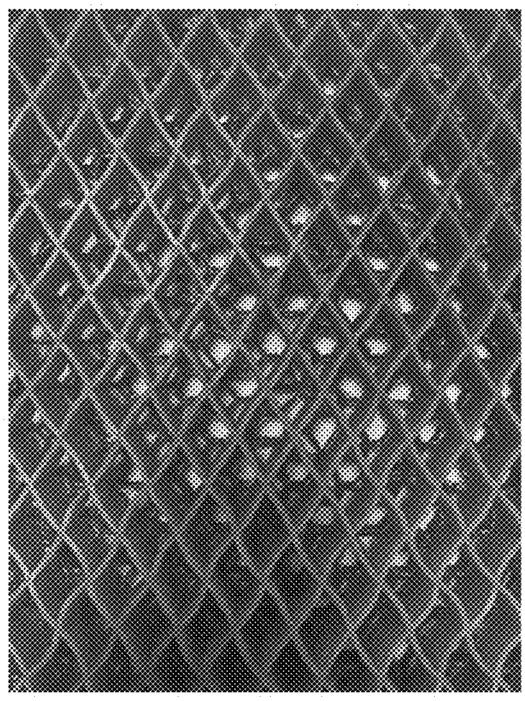
FIG. 12 presents a substantially top view in a first orientation of a portion of a gel layer comprising the gel space of FIG. 7J, in accordance with embodiments herein.
Figure 13:
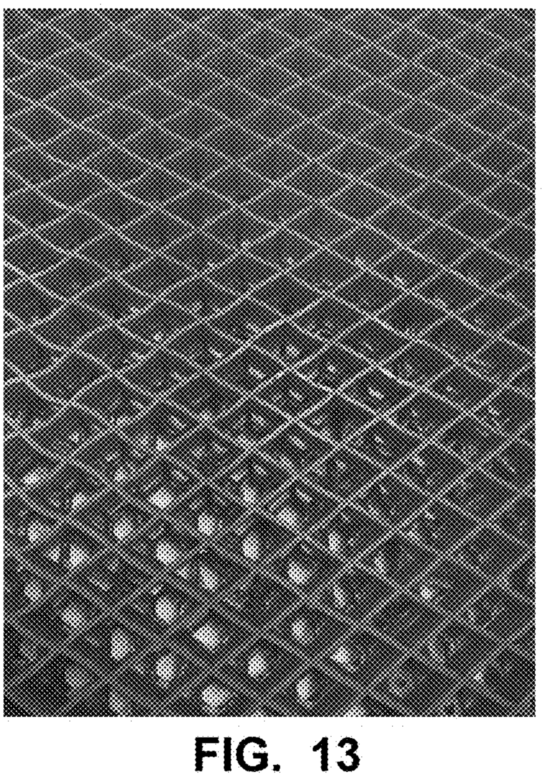
FIG. 13 presents a substantially top view in a second orientation of a portion of a gel layer comprising the gel space of FIG. 7J, in accordance with embodiments herein.
Figure 14:
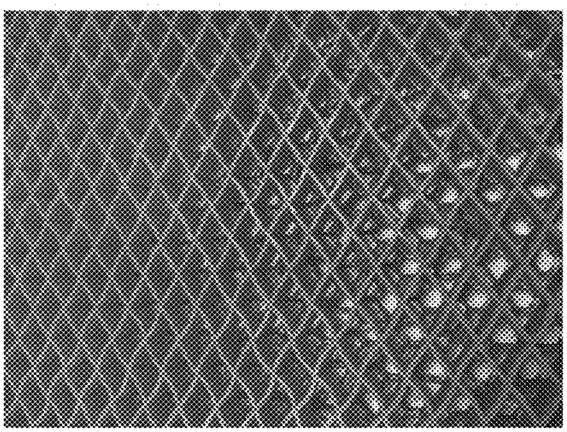
FIG. 14 presents a substantially top view in the first orientation of a portion of a gel layer comprising the gel space of FIG. 7J, in accordance with embodiments herein.
Figure 15:
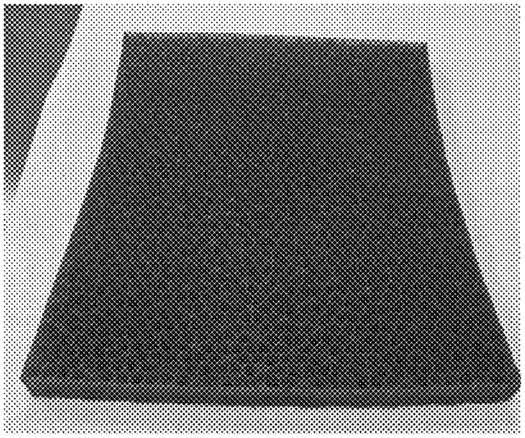
FIG. 15 presents a substantially top view of a gel layer comprising the gel space of FIG. 7K in the rosette of FIG. 7L, in accordance with embodiments herein.
Figure 16:
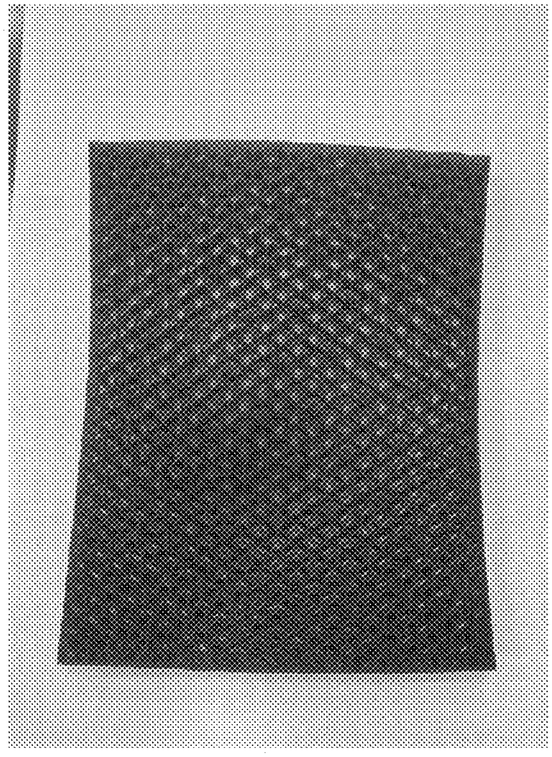
FIG. 16 presents a substantially top view of a gel layer comprising an upper gel lattice comprising the gel space of FIG. 7K in the rosette of FIG. 7L and a lower gel lattice comprising the gel space of FIG. 7J, in accordance with embodiments herein.
Figure 17:
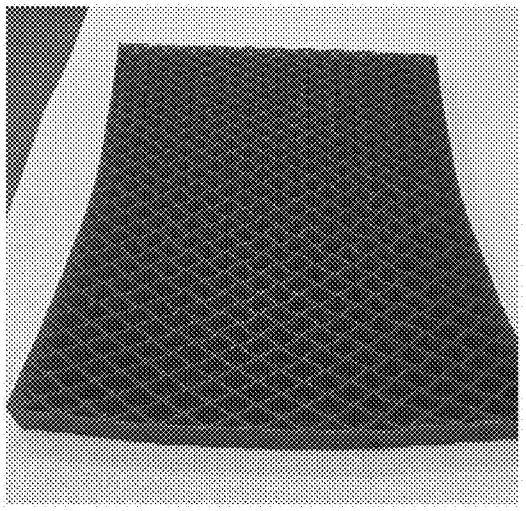
FIG. 17 presents a substantially top view of a gel layer comprising an upper gel lattice comprising the gel space of FIG. 7J, in accordance with embodiments herein.
Figure 18:
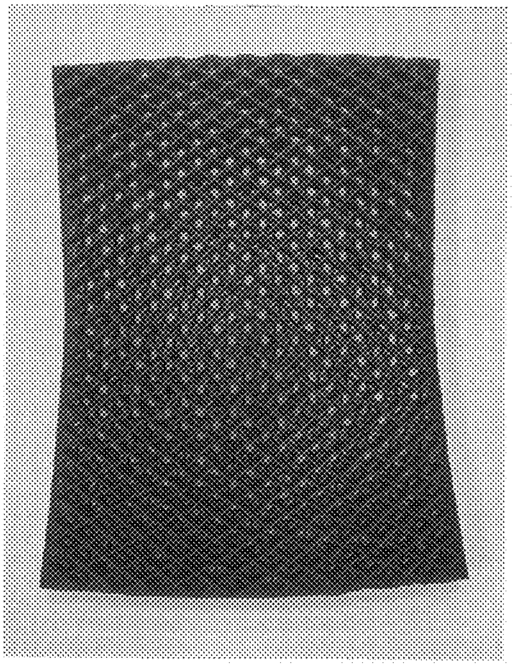
FIG. 18 presents a substantially top view of a gel layer comprising an upper gel lattice comprising the gel space of FIG. 7J and a lower gel lattice comprising the gel space of FIG. 7K in the rosette of FIG. 7L, in accordance with embodiments herein.
Figure 19:
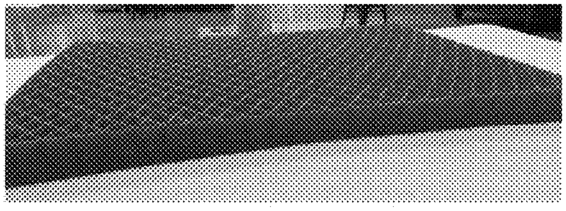
FIG. 19 presents a perspective view of a gel layer comprising an upper gel lattice comprising the gel space of FIG. 7J, in accordance with embodiments herein.
Figure 20:
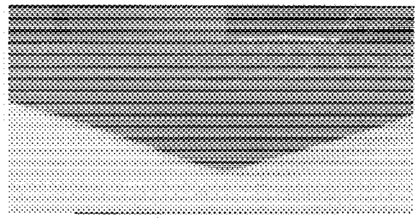
FIG. 20 presents a perspective view of a gel layer comprising an upper gel lattice comprising the gel space of FIG. 7J, in accordance with embodiments herein.
Figure 21:
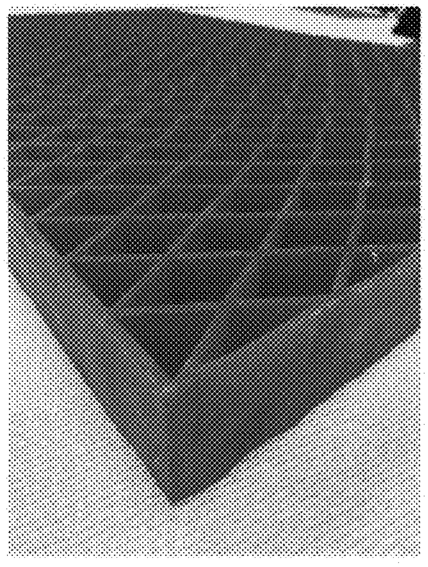
FIG. 21 presents a perspective view of a gel layer comprising an upper gel lattice comprising the gel space of FIG. 7J, in accordance with embodiments herein.
Figure 22:
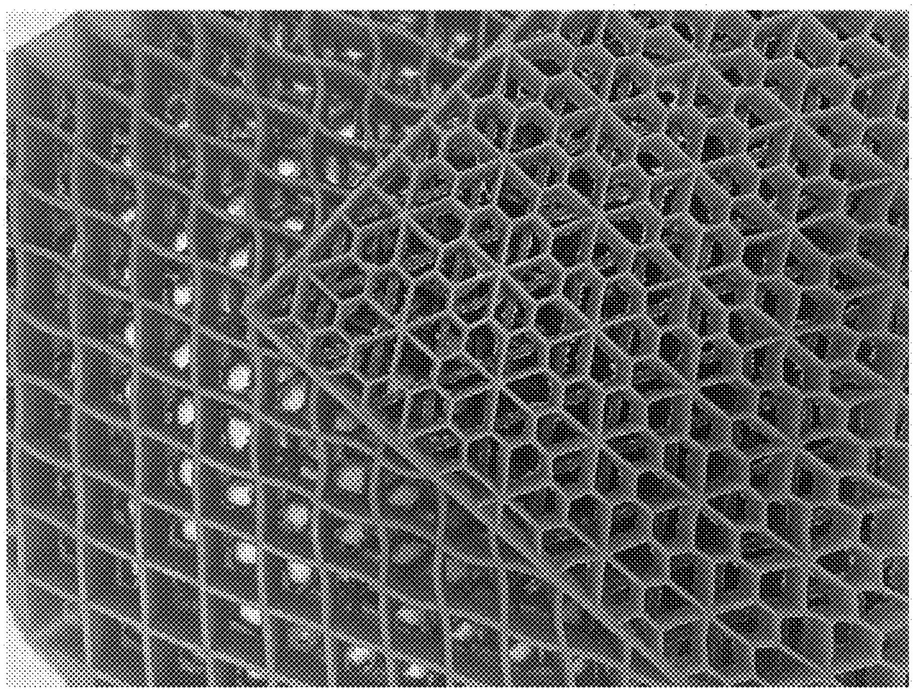
FIG. 22 presents substantially top views of portions of two gel layers, one gel layer comprising an upper gel lattice comprising the gel space of FIG. 7J and a lower gel lattice comprising the gel space of FIG. 7K in the rosette of FIG. 7L, and the other gel layer comprising an upper gel lattice comprising the gel space of FIG. 7K in the rosette of FIG. 7L and a lower gel lattice comprising the gel space of FIG. 7J, in accordance with embodiments herein.

We turn now to FIG. 9, which provides a stylized depiction of a system 900 for fabricating a body support article in accordance with embodiments herein is illustrated. The system 900 of FIG. 9 may comprise a manufacturing system 910, a processing controller 920, and a user interface 930. The manufacturing system 910 may manufacture body support articles based upon one or more designs generated and/or provided by processing controller 920 and input received from the user interface 930.

The manufacturing system 910 may comprise various processing stations, such as viscoelastic foam layer forming station 911, gel layer forming station 912, gel layer laminating station 913, other layer forming station(s) 915, material handling stations, final product handling stations, etc. Each of the processing stations may comprise one or more appropriate apparatus, input conveyances, output conveyances, utility subsystems (e.g., water, electricity, heat, steam, coolant, etc.), local controls, sensors or other process data gathering devices, communications with other processing stations, the processing controller 920, the user interface 930, etc. The operations to be performed at each station 911-915 may be those described above regarding corresponding operations performed in the method 800.

The manufacturing system 910 may also comprise an interface 919 that is capable of providing communications between two or more of one, some, or all processing stations 911-915, the processing controller 920, and the user interface 930. One or more of the processing steps performed by the manufacturing system 910 may be controlled by the processing controller 920. The processing controller 920 may be a workstation computer, a desktop computer, a laptop computer, a tablet computer, or any other type of computing device comprising one or more software products that are capable of controlling processes, which may comprise receiving process feedback, receiving test results data, performing learning cycle adjustments, performing process adjustments, etc.

The user interface 930 may be configured to receive any desired input from one or more users. The user(s) may be manufacturing worker(s) and/or consumer(s). In one embodiment, the input is a first user preference between at least a first firmness and a second firmness. The user interface 930 may be instantiated in hardware or software at a location remote from the manufacturing system 910. For example, the user interface 930 may be instantiated as an app on a computer or smartphone; a webpage accessible via a browser; a kiosk deployed at a point-of-sale location (e.g., a mattress retailer) and comprising a touchscreen and/or physical buttons for user input and a display, such as a graphical display, for presenting options and instructions to the user; etc.

In one embodiment, the user interface 930 may be configured to receive first and second user preferences between at least a first firmness and a second firmness. For the avoidance of doubt, the first user's preferred firmness could be the same as the second user's preferred firmness but need not be.

In a particular embodiment, the manufacturing system 910 may be configured to form a viscoelastic foam layer of a body support article, the viscoelastic foam layer having a rectangular prism shape having a viscoelastic foam layer width and a viscoelastic foam layer length; and form a gel layer of a body support structure from a first gel material, wherein the gel layer comprises a plurality of ridges at or above a first height and a plurality of valleys at or below a second height below the first height.

In further embodiments, the manufacturing system 910 may be configured to perform one or more of the following actions:

form at least one layer of the body support structure above the gel layer; form at least one layer of the body support structure below the viscoelastic foam layer; and/or fill at least one of the valleys with a second material.

Generally, any structures shown and described in one embodiment of the present disclosure may be incorporated into any other embodiment of the present disclosure, regardless of whether such structures are explicitly described as being components of that other embodiment.

A body support structure of any disclosed embodiment may be positioned on any appropriate foundation disposed thereunder. For example, if the body support structure is a mattress, the foundation may be selected from, but is not limited to, box springs; metal frames; and adjustable supports, including electromechanically adjustable supports; among others.

The particular embodiments disclosed above are illustrative only, as the disclosure may be modified and practiced in different, but equivalent manners, apparent to those skilled in the art having the benefit of the teachings herein. For example, the process steps set forth above may be performed in a different order. Furthermore, no limitations are intended to the details of construction or design herein shown, other than as described in the claims below. It is, therefore, evident that the particular embodiments disclosed above may be altered or modified and all such variations are considered within the scope and spirit of the disclosure. Accordingly, the protection sought herein is as set forth in the claims below.

What is claimed is:

1. A body support structure, comprising:

a gel layer comprising at least a first and second gel lattice, wherein the first gel lattice comprises a plurality of first gel segments having a first preselected width and a second preselected height to produce a first desired firmness in the first gel lattice, wherein the plurality of first gel segments define a plurality of first gaps, and wherein the second gel lattice comprises a plurality of second gel segments having a third preselected width and a fourth preselected height to produce a desired firmness in the second gel lattice, wherein the plurality of second gel segments define a plurality of second gaps, and the first gel lattice and the second gel lattice are cointegrated along a largest surface of each gel lattice; and a viscoelastic foam layer;

wherein the gel layer is directly laminated to the viscoelastic foam layer.

2. The body support structure of claim 1, wherein each of the first gaps has a shape selected from the group consisting of squares, rectangles, diamonds, parallelograms, other quadrilaterals, polygons with other than four sides, circles, ellipses, and other curved shapes; each of the second gaps has a shape selected from the group consisting of squares, rectangles, diamonds, parallelograms, other quadrilaterals, polygons with other than four sides, circles, ellipses, and other curved shapes; and the shape of each of the first gaps is different from the shape of each of the second gaps.

3. The body support structure of claim 2, wherein the first gel lattice is a rectangular prism with a longest dimension essentially equal to a longest dimension of the viscoelastic foam layer and a second-longest dimension essentially equal to half a second-longest dimension of the viscoelastic foam layer, and the first gel lattice is farther than the second gel lattice from the viscoelastic foam layer; and the second gel lattice being substantially identical to the first gel lattice except that the second gel lattice is farther than the first gel lattice from the viscoelastic foam layer.

4. The body support structure of claim 1, wherein each of the first gaps has a diamond shape and each of the second gaps has a convex pentagon shape that is neither equilateral nor equiangular.

5. The body support structure of claim 1, wherein the gel layer comprises by weight: styrene block copolymer 2-80% and plasticized oil 10-90%.

6. The body support structure of claim 1, wherein the gel layer comprises by weight: polystyrene block copolymer 5-80% and plasticized oil 10-90%.

7. A method, comprising:

forming a gel layer comprising at least a first and second gel lattice, wherein the first gel lattice comprises a plurality of first gel segments having a first preselected width and a second preselected height to produce a first desired firmness in the first gel lattice, wherein the plurality of first gel segments define a plurality of first gaps, and wherein the second gel lattice comprises a plurality of second gel segments having a third preselected width and a fourth preselected height to produce a desired firmness in the second gel lattice, wherein the plurality of second gel segments define a plurality of second gaps, and the first gel lattice and the second gel lattice are cointegrated along a largest surface of each gel lattice;

forming a viscoelastic foam layer; and laminating the gel layer to the viscoelastic foam layer.

8. The method of claim 7, wherein forming the gel layer comprises forming each of the first gaps to have a shape selected from the group consisting of squares, rectangles, diamonds, parallelograms, other quadrilaterals, polygons with other than four sides, circles, ellipses, and other curved shapes; forming each of the second gaps to have a shape selected from the group consisting of squares, rectangles, diamonds, parallelograms, other quadrilaterals, polygons with other than four sides, circles, ellipses, and other curved shapes; and forming the shape of each of the first gaps to be different from the shape of each of the second gaps.

9. The method of claim 8, wherein forming the gel layer comprises forming the first gel lattice to be a rectangular prism with a longest dimension essentially equal to a longest dimension of the viscoelastic foam layer and a second-longest dimension essentially equal to half a second-longest dimension of the viscoelastic foam layer; and the method further comprises forming the second gel lattice substantially identical to the first gel lattice; and laminating the gel layer to the viscoelastic foam layer comprises laminating the second gel lattice to a first half of an upper surface of the viscoelastic foam layer and laminating the first gel lattice to a second half of the upper surface of the viscoelastic foam layer.

10. The method of claim 7, wherein forming the gel layer comprises forming each of the first gaps to have a diamond shape and forming each of the second gaps to have a convex pentagon shape that is neither equilateral nor equiangular.

11. The method of claim 7, wherein forming the gel layer comprises forming the gel layer to contain by weight: styrene block copolymer 2-80% and plasticized oil 10-90%.

12. The method of claim 7, wherein forming the gel layer comprises forming the gel layer to contain by weight: polystyrene block copolymer 5-80% and plasticized oil 10-90%.

13. A system, comprising:

a manufacturing system configured to:

form a gel layer comprising at least a first and second gel lattice, wherein the first gel lattice comprises a plurality of first gel segments having a first preselected width and a second preselected height to produce a first desired firmness in the first gel lattice, wherein the plurality of first gel segments define a plurality of first gaps, and the second gel lattice comprises a plurality of second gel segments having a third preselected width and a fourth preselected height to produce a desired firmness in the second gel lattice, wherein the plurality of second gel segments define a plurality of second gaps;

form a viscoelastic foam layer; and laminate the gel layer to the viscoelastic foam layer.

14. The system of claim 13, wherein the manufacturing system is configured to form the gel layer such that each of the first gaps has a shape selected from the group consisting of squares, rectangles, diamonds, parallelograms, other quadrilaterals, polygons with other than four sides, circles, ellipses, and other curved shapes; each of the second gaps has a shape selected from the group consisting of squares, rectangles, diamonds, parallelograms, other quadrilaterals, polygons with other than four sides, circles, ellipses, and other curved shapes; and the shape of each of the first gaps to be different from the shape of each of the second gaps.

15. The system of claim 14, wherein the manufacturing system is configured to form the gel layer by forming each of the first and second gel lattices to be a rectangular essentially with a longest dimension equal to a longest dimension of the viscoelastic foam layer and a second-longest dimension essentially equal to half a second-longest dimension of the viscoelastic foam layer; and the manufacturing system is configured to laminate the gel layer to the viscoelastic foam layer by laminating the second gel lattice to a first half of an upper surface of the viscoelastic foam layer and laminating the first gel lattice to a second half of the upper surface of the viscoelastic foam layer.

16. The system of claim 13, wherein the manufacturing system is configured to form the gel layer such that each of the first gaps has a diamond shape and each of the second gaps has a convex pentagon shape that is neither equilateral nor equiangular.

17. The system of claim 13, wherein the manufacturing system is configured to form the gel layer to comprise by weight: styrene block copolymer 2-80% and plasticized oil 10-90%.

18. The system of claim 13, wherein the manufacturing system is configured to form the gel layer to comprise by weight: polystyrene block copolymer 5-80% and plasticized oil 10-90%.

* * * * *